US009966078B2

(12) United States Patent
Allen et al.

(10) Patent No.: US 9,966,078 B2
(45) Date of Patent: May 8, 2018

(54) COGNITIVE SECURITY FOR VOICE PHISHING ACTIVITY

(71) Applicant: International Business Machines Corporation, Armonk, NY (US)

(72) Inventors: Corville O. Allen, Morrisville, NC (US); Donna K. Byron, Petersham, MA (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 203 days.

(21) Appl. No.: 14/859,258

(22) Filed: Sep. 19, 2015

(65) Prior Publication Data
US 2016/0104485 A1 Apr. 14, 2016

Related U.S. Application Data

(63) Continuation of application No. 14/510,901, filed on Oct. 9, 2014.

(51) Int. Cl.
*G10L 15/00* (2013.01)
*G10L 15/06* (2013.01)
(Continued)

(52) U.S. Cl.
CPC ............ *G10L 17/08* (2013.01); *G10L 17/26* (2013.01); *G10L 25/51* (2013.01); *H04L 51/12* (2013.01);
(Continued)

(58) Field of Classification Search
USPC ........................................................ 704/243
See application file for complete search history.

(56) References Cited

U.S. PATENT DOCUMENTS 6,925,307 B1 * 8/2005 Mamdani ............... G06Q 20/04
370/264
7,930,168 B2 4/2011 Weng et al.
(Continued)

FOREIGN PATENT DOCUMENTS

WO 2011085108 7/2011
WO 2013059487 4/2013

OTHER PUBLICATIONS

Maggi et al., "A Social-Engineering-Centric Data Collection Initiative to Study Phishing," Proceedings of the First Workshop on Building Analysis Datasets and Gathering Experience Returns for Security, Salzburg, Austria, Apr. 2011, pp. 107-108.
(Continued)

*Primary Examiner* — Kevin Ky
(74) *Attorney, Agent, or Firm* — VanLeeuwen & VanLeeuwen; Diana R. Gerhardt

(57) ABSTRACT

An approach is provided in which a question answer system monitors a voice conversation between a first entity and a second entity. During the conversation, the question answer system parses the conversation into information phrases, and constructs the information phrases into a current conversation pattern. The question answer system identifies deceptive conversation properties of the current conversation by analyzing the current conversation pattern against domain-based conversation patterns. The question answer system, in turn, sends an alert message to the first entity to notify the first entity of the identified deceptive conversation properties.

9 Claims, 9 Drawing Sheets

(51) Int. Cl.
*G10L 17/08* (2013.01)
*G10L 25/51* (2013.01)
*H04L 12/58* (2006.01)
*H04L 29/06* (2006.01)
*G10L 17/26* (2013.01)
*G10L 15/18* (2013.01)

(52) U.S. Cl.
CPC ...... *H04L 63/1408* (2013.01); *H04L 63/1483* (2013.01); *G10L 15/1822* (2013.01)

(56) References Cited

U.S. PATENT DOCUMENTS

| | | | |
|---|---|---|---|
| 8,412,645 | B2 | 4/2013 | Ramaswamy et al. |
| 2006/0020814 | A1 | 1/2006 | Lieblich et al. |
| 2007/0234061 | A1 | 10/2007 | Teo |
| 2009/0276839 | A1 | 11/2009 | Peneder |
| 2012/0254333 | A1 | 10/2012 | Chandramouli et al. |
| 2013/0042302 | A1 | 2/2013 | Chow et al. |
| 2013/0097682 | A1* | 4/2013 | Zeljkovic ............ H04L 9/3231 726/7 |
| 2013/0132091 | A1 | 5/2013 | Skerpac |
| 2014/0070947 | A1 | 3/2014 | Ionson |
| 2014/0254778 | A1* | 9/2014 | Zeppenfeld ........... H04M 3/523 379/88.02 |
| 2014/0270114 | A1 | 9/2014 | Kolbegger et al. |
| 2015/0142448 | A1 | 5/2015 | Tsujino |
| 2015/0269946 | A1 | 9/2015 | Jones |

OTHER PUBLICATIONS

"Cognitive Security Analytics Company SparkCognition Launches With Support from Leading Investors," PRWeb, Apr. 15, 2014, 2 pages.

Udell, "SpamBayes knows spam," InfoWorld, May 2003, 3 page.

Allen et al., "Cognitive Security for Voice Phishing Activity," U.S. Appl. No. 14/510,901, filed Oct. 9, 2014, 45 pages.

"List of IBM Patents or Patent Applications Treated as Related," Letter from Leslie A. Van Leeuwen, Sep. 19, 2015, 1 page.

* cited by examiner

COGNITIVE SECURITY FOR VOICE PHISHING ACTIVITY

BACKGROUND

"Phishing" refers to an act of a human or computer system that attempts to obtain sensitive information from unknowing victims. Phishers traditionally send an official-looking e-mail to a potential victim pretending to be part of the potential victim's bank or retail establishment. The email may request the potential victim to respond with sensitive information, or click on a website link to a location where the potential victim enters sensitive information such as credit card numbers, social security numbers, passwords, birth dates, etc.

In recent years, phishers have turned to voice phishing, or "vishing," to capitalize on potential victims through phone call requests. Voice phishers, or "vishers," may send an e-mail message requesting the user to call a phone number, which triggers a voice response system that asks for the user's credit card number or other personal information. Vishers may also call unsuspecting victims directly and use a voice over IP (VoIP) system to mask the vishers' caller identity. As a result, legal authorities have difficulty monitoring and tracing voice phising activity and, in turn, have a challenge in notifying the public.

BRIEF SUMMARY

According to one embodiment of the present disclosure, an approach is provided in which a question answer system monitors a voice conversation between a first entity and a second entity. During the conversation, the question answer system parses the conversation into information phrases, and constructs the information phrases into a current conversation pattern. The question answer system identifies deceptive conversation properties of the current conversation by analyzing the current conversation pattern against domain-based conversation patterns. The question answer system, in turn, sends an alert message to the first entity to notify the first entity of the identified deceptive conversation properties.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
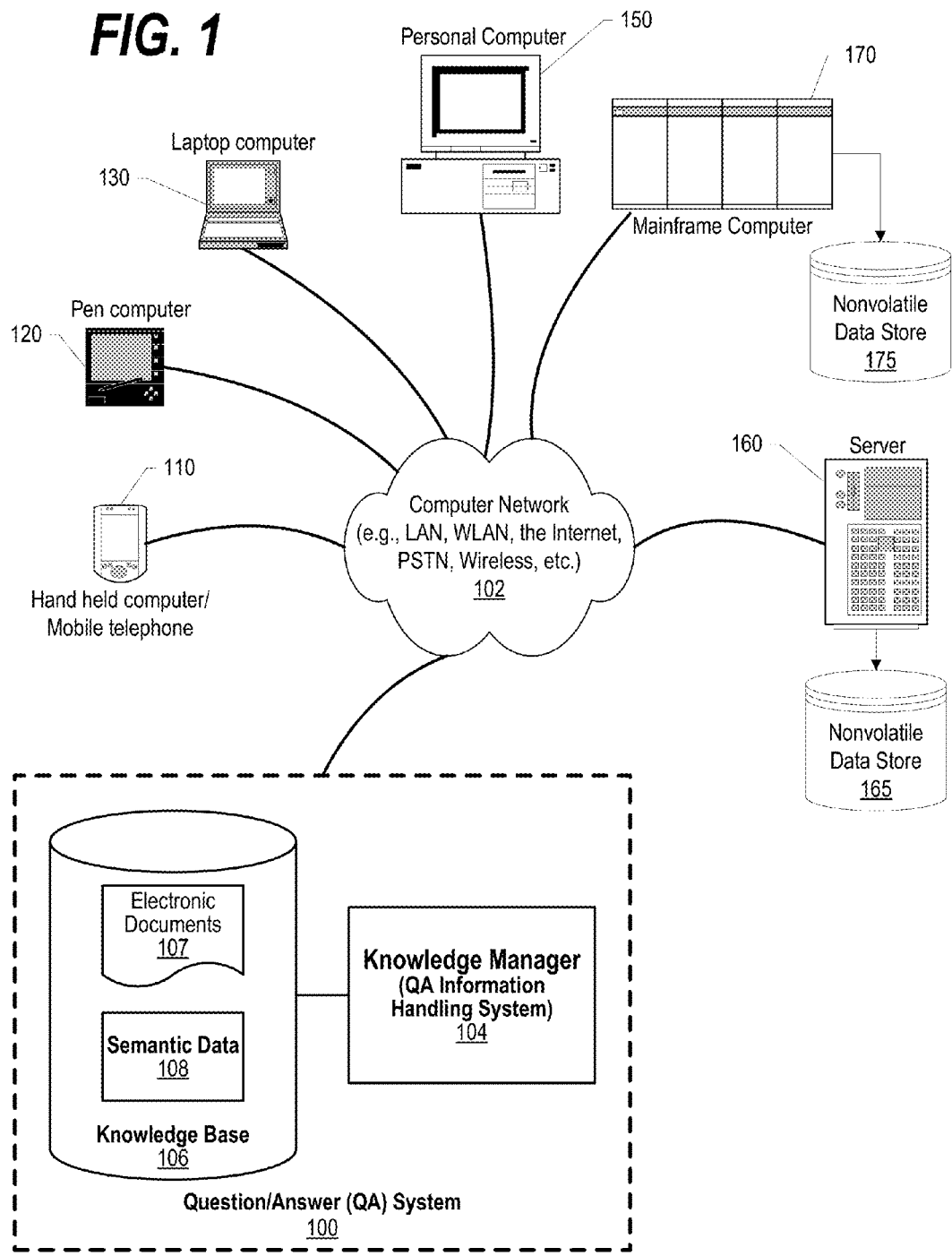
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, information phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
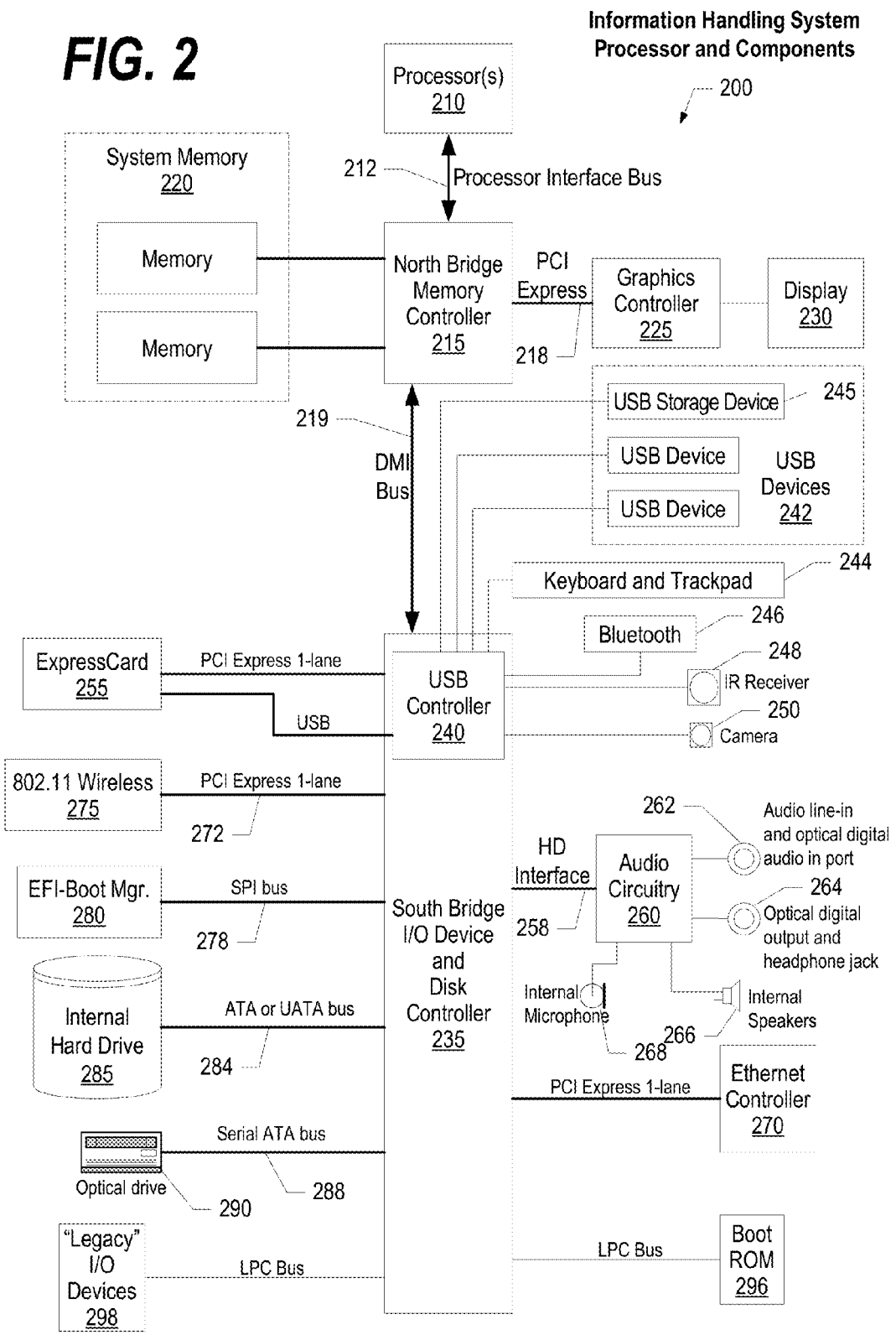
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE .802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system that monitors conversational statements between a user and a remote entity and informs the user when the conversation includes deceptive conversation properties. In one embodiment, the deceptive conversation properties are based on detecting a remote entity that requests sensitive information in a different order relative to a valid conversation pattern, such as "I'm calling about your account, please confirm your social security number" before the remote entity provides the user's account number. In another embodiment, the information handling system detects and prohibits sending out of order user-provided sensitive information to the remote entity such as "Oh, do you mean my Bank ABC account?"

Figure 3:
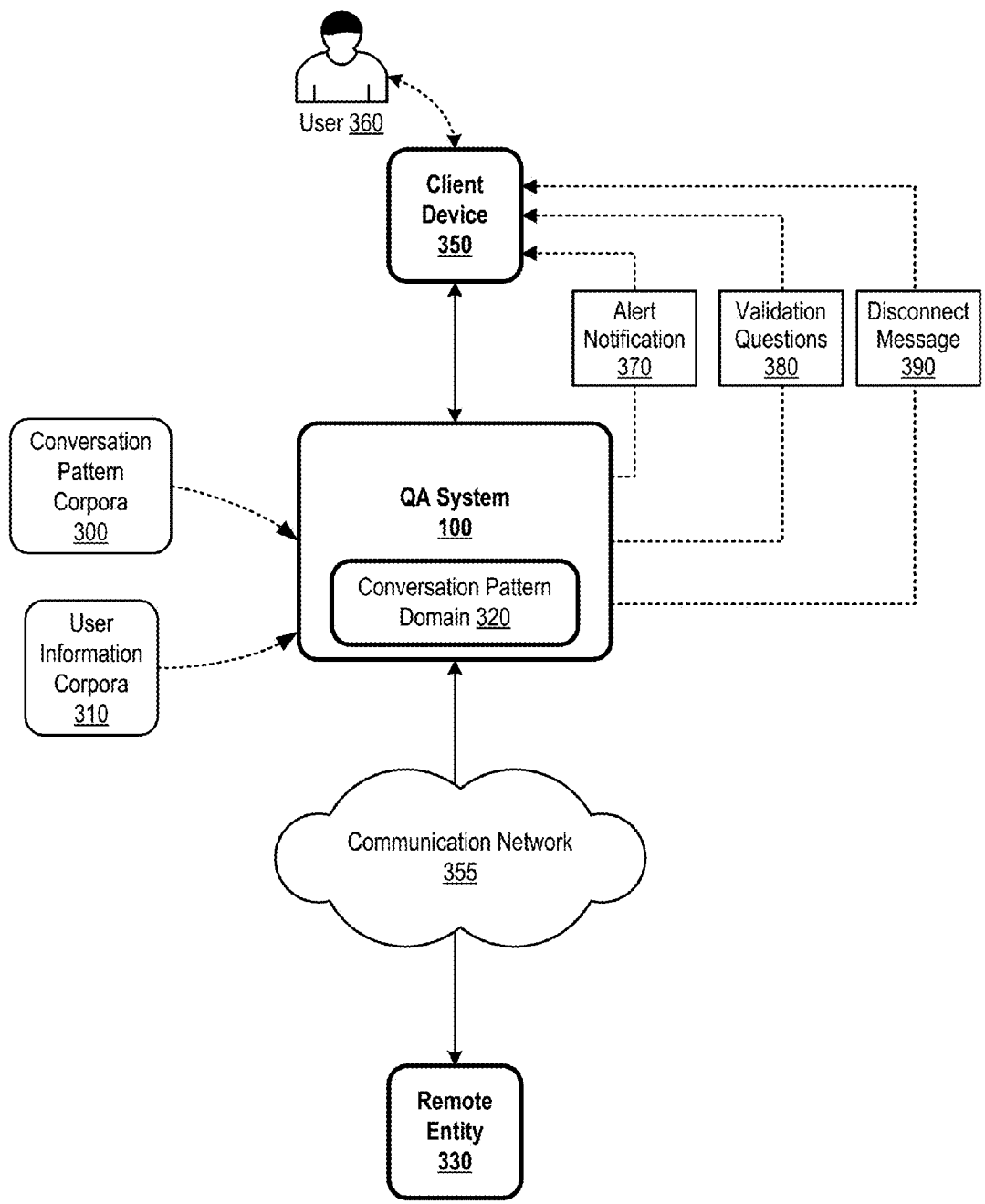
FIG. 3 is an exemplary diagram depicting a question answer system that monitors a conversation pattern between a client device and a remote entity for deceptive conversation properties.

FIG. 3 is an exemplary diagram depicting a question answer system that monitors a conversation pattern between a client device and a remote entity for deceptive conversation properties. Question answer system 100 ingests conversation pattern corpora 300, which includes a corpus of documents pertaining to valid conversation patterns and deceptive conversation patterns. For example, conversation pattern corpora 300 may include documents such as bank teller phone etiquette guidelines, phishing articles, telemarketer information, etc. In turn, question answer system 100 annotates conversation patterns from the documents, such as a "request for information pattern" of "Tell/give/provide me your X," and stores the conversation patterns in conversation pattern domain 320 (see FIG. 7 and corresponding text for further details).

In one embodiment, question answer system 100 ingests user information corpora 310 that includes user documents such as bank statements, birth certificates, driver's license information, or other documents that include sensitive information corresponding to the user. In this embodiment, question answer system 100 uses information in the documents to verify content provided by remote entities as well as to detect sensitive content that user 360 attempts to provide to a remote entity (see FIG. 9 and corresponding text for further details). In this embodiment, question answer system 100 may also generate a user information domain from which to generate questions and analyze remote entity information phrases. For example, question answer system 100 may extract user 360's account number from a bank statement and use the account number to validate remote entity 330 user's information, or to validate remote entity 330 user's answer to user 360's validation question of "What is my account number?"

Question answer system 100 begins monitoring calls to/from client device 350 over communication network 355. As discussed herein, client device 350 or remote entity 330 may be the initiator of the conversation. For example, user 360 may receive an email that prompts user 360 to call remote entity 330 via client device 350. In another example, remote entity 330 may initiate conversation 340 to client device 350. Communication network 355 may be a telephone network, a computer network, a VoIP network, or other network capable of supporting a voice conversation.

Figure 5:
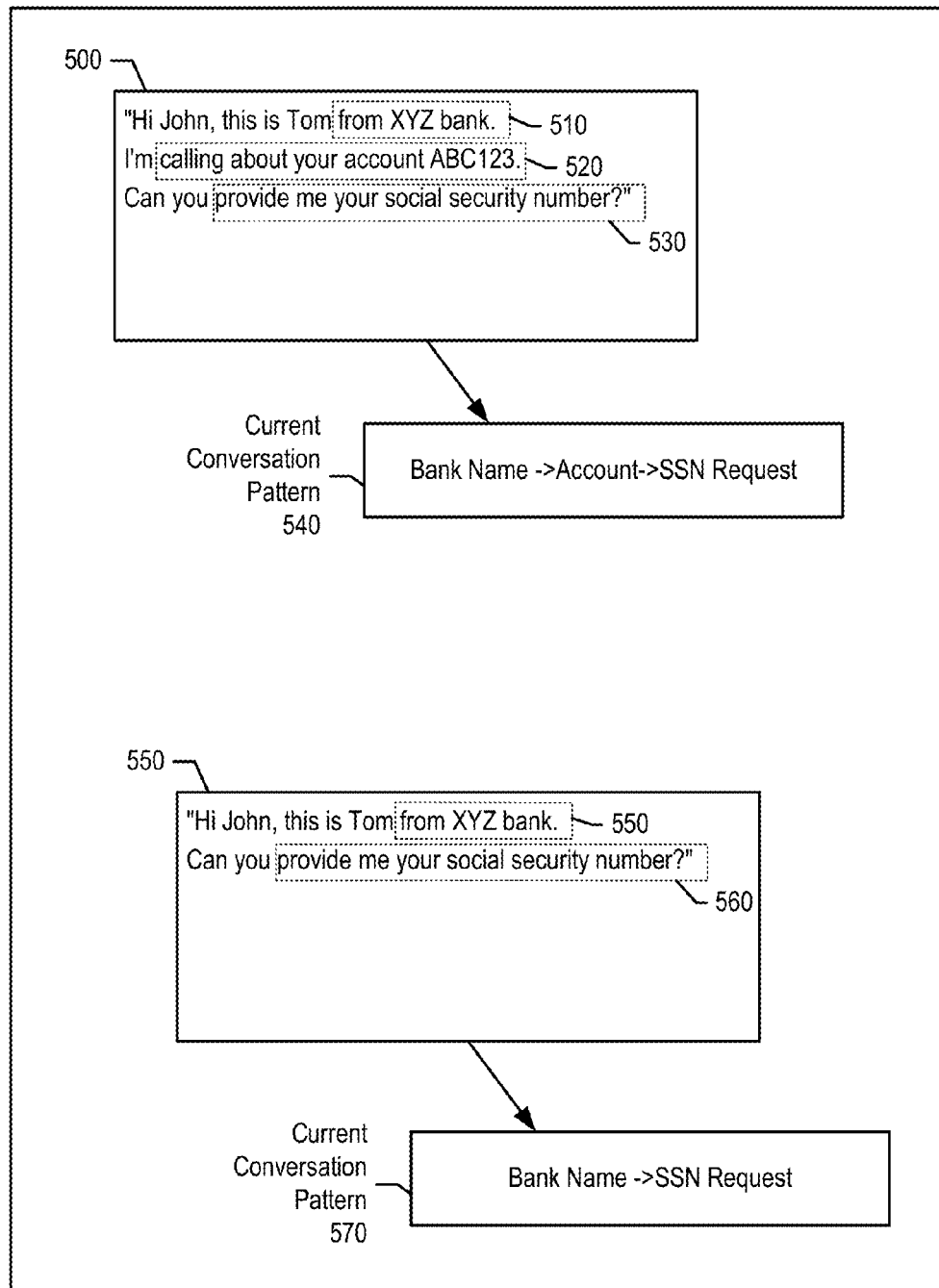
FIG. 5 is an exemplary diagram depicting examples of current conversation patterns.

As the conversation transpires, question answer system 100 parses conversation statements into information phrases such as those shown in FIG. 5. Question answer system 100 transforms the information phrases to information elements and constructs a current conversation pattern from the information elements. In one embodiment, question answer system 100 cognitively analyzes a dialogue between client device 350 and remote entity 330 to increase the accuracy of detecting deceptive conversation properties. For example, the dialogue analysis may provide details of the information flow order between client device 350 and remote entity 330 instead of analyzing a specific conversation statement from one of the entities (see FIG. 6 and corresponding text for further details).

Question answer system 100 analyzes the current conversation pattern against the domain-based conversation patterns in conversation pattern domain 320 to determine whether the current conversation pattern exhibits deceptive conversation properties. For example, the current conversation pattern may be "tellername→BankABC→AccountNumberReqeust" and question answer system 100 determines that remote entity 330 is requesting user 360's account number when, in fact, remote entity 330 should be providing the account number to user 360 (see FIG. 9 and corresponding text for further details).

In turn, question answer system 100 sends alert notification 370 to client device 350, which may instruct client device 350 to display a message to user 350, flash a light, sound a tone, or other action to get the attention of user 360. For example, if remote entity 330 says, "Please provide your credit card number" without providing user 360 with an account number, question answer system 100 sends an alert to client device 350 to warn user 360 of the deceptive conversation properties. In one embodiment, question answer system 100 may send multiple alert notifications to multiple client devices, such as user 360's television, cell phone, home phone, etc. (see FIG. 4 and corresponding text for further details).

In another embodiment, when question answer system 100 detects deceptive conversation properties, question answer system 100 sends validation question 380 to client device 350 that includes a question for user 360 to ask remote entity 330 (or remote entity 330's user). For example, if question answer system 100 detected that remote entity 330 requested user 360 to verify user 360's birthdate, validation question 380 may include a question for user 360 to ask remote entity 330, such as "What month was I born?" In this embodiment, question answer system 100 may generate questions based upon information ingested from user information corpora 310. If remote entity 330 does not provide the correct answer (e.g., "July"), question answer system 100 sends suggested disconnect message 390 to client device 350.

In one embodiment, question answer system 100 stores information pertaining to deceptive callers in a restricted remote entity list (e.g., phone number, IP address, name, etc.) such that question answer system 100 prohibits subsequent calls from the deceptive callers to/from client device 350.

Figure 4:
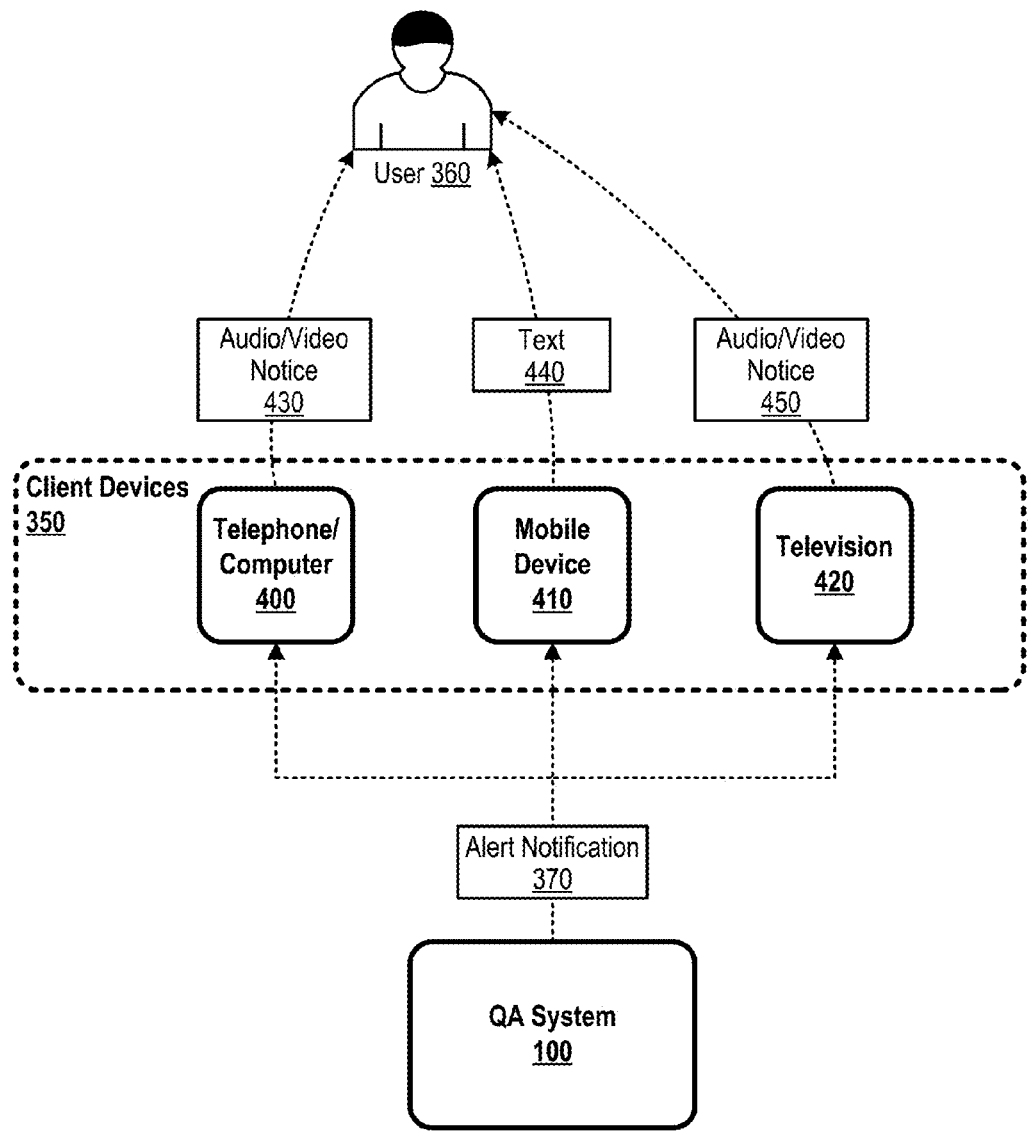
FIG. 4 is an exemplary diagram depicting a question answer system interfacing with a user's various client device types.

FIG. 4 is an exemplary diagram depicting a question answer system interfacing with a user's various client device types. Client device 350 may include telephone/computer 400, mobile device 410, television 420, or other electronic device that is capable of informing user 360 of a deceptive conversation. Question answer system 100 may send alert notification 370 to each of client devices 350 to ensure that user 360 receives the alert during the conversation. Telephone/computer 400 may display a message on a display or sound an alert (audio/video notice 430). Mobile device 410 may provide the alert through a text message 440. Television 420 may initiate audio/video notice 450, such as a banner across the screen or an audio tone.

As those skilled in the art can appreciate, client device 350 may include other devices such as a stereo system, a radio, etc. In one embodiment, user 360 configures question answer system 100 to transmit alerts to the different client devices. For example, question answer system 100 may store a list of phone numbers, IP address, wireless connections, etc. of client devices 350 to send alert notification 370 to multiple client devices 350 when question answer system 100 detects an ongoing deceptive conversation.

FIG. 5 is an exemplary diagram depicting examples of current conversation patterns. Question answer system 100 intercepts statements such as statements 500 and 550, and parses the statements into information phrases. In one embodiment, question answer system 100 uses English Slot Grammar (ESG) to identify information phrases of information such as "My name is Tim" (name offered) "from ABC bank" (bank name offered) "account 123456" (account number offered). In another embodiment, the process may build and utilize an annotator that triggers on information phrases like "what is", "tell me", "please provide", etc.

Question answer system 100, in turn, generates information elements for the various information phrases and constructs a conversation pattern using the information elements. FIG. 5 shows that statement 500 includes information phrases 510, 520, and 530. As such, question answer system 100 generates corresponding information elements "Bank name," "Account," "SSN Request," and constructs current conversation pattern 540 using the information elements in their appropriate order.

Question answer system 100 evaluates current conversation pattern 540 against domain-based conversation patters in conversation pattern domain 320 to determine whether current conversation pattern 540 exhibits deceptive conversation properties. For example, question answer system 100 may match current conversation pattern 540 to a valid conversation pattern and determine that the corresponding remote entity is not deceptive.

Likewise, statement 550 includes information phrases 550 and 560. Question answer system 100 constructs current conversation pattern 570 from the information elements corresponding to the information phrases and evaluates current conversation pattern 570 against conversation pattern domain 320 to determine whether current conversation pattern 540 exhibits deceptive conversation properties. Question answer system 100 may flag current conversation pattern 570 as exhibiting deceptive conversation properties because the pattern does not include the user's account number such as that of current conversation pattern 540 (see FIG. 9 and corresponding text for further details).

Figure 6:
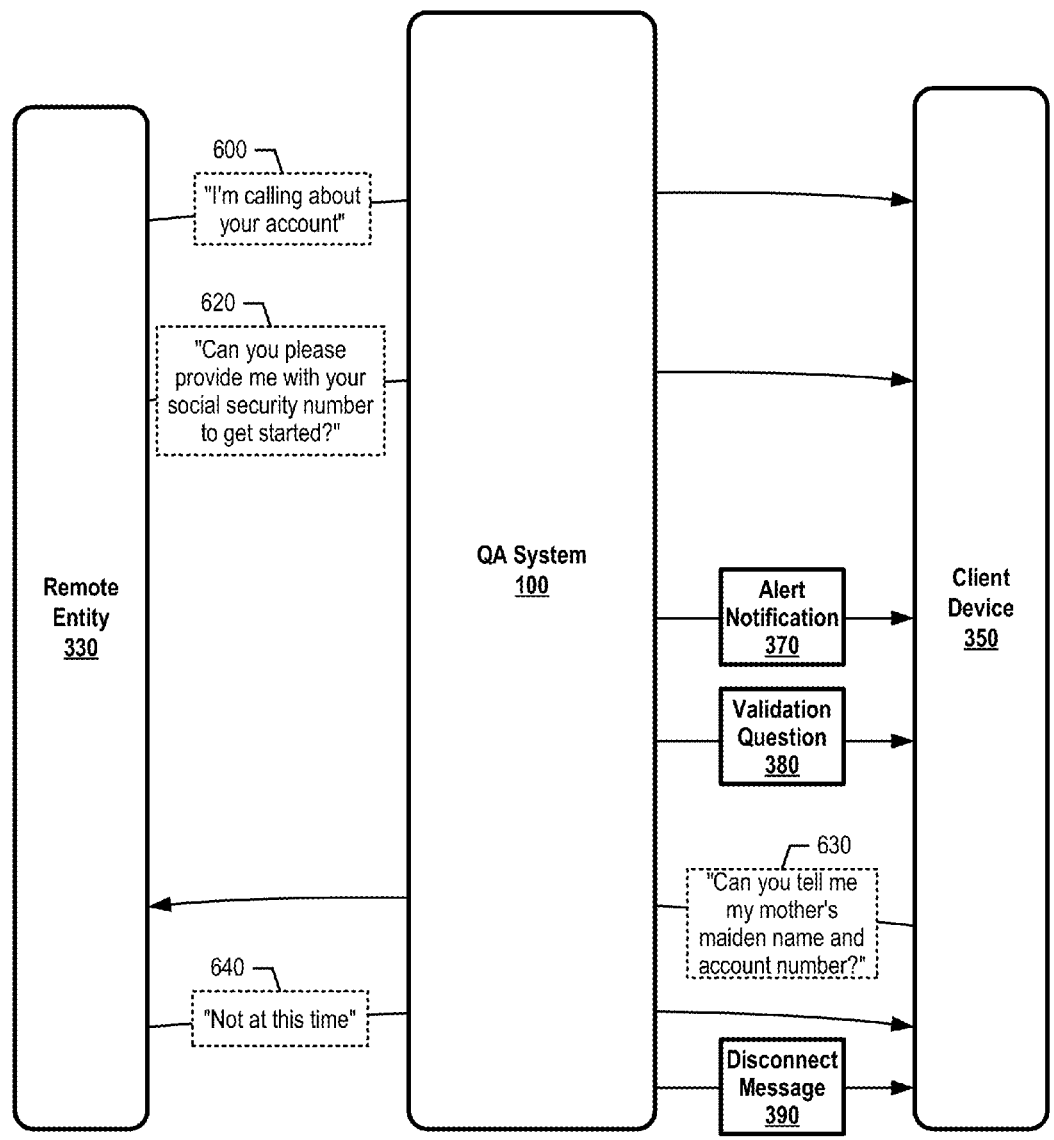
FIG. 6 is an exemplary diagram depicting a question answer system that monitors a conversation dialogue between a client device and a remote entity.

FIG. 6 is an exemplary diagram depicting a question answer system that monitors a conversation dialogue between a client device and a remote entity. FIG. 6 shows an embodiment where remote entity 330 initiates a conversation with client device 350. Likewise, question answer system 100 performs steps similar to that shown in FIG. 6 for conversations initiated by client device 350.

Remote entity 330 sends statement 600 to client device 350. Question answer system 100 cognitively analyzes statement 600 and constructs a current conversation pattern. The current conversation pattern at this point may not indicate a deceptive conversation. When remote entity 330 continues the dialogue with statement 620, question answer system 100 adds corresponding information elements to the current conversation pattern and determines that the current conversation pattern has deceptive conversation properties, such as remote entity 330 attempting to obtain social security number information prior to providing adequate account information. In turn, question answer system 100 sends alert notification 370 to client device 350. In one embodiment, question answer system 100 also sends validation question 380 to client device 350 for client device 350's user 360 to ask remote entity 330.

Entity user 360's client device 350 asks the validation question (statement 630) to remote entity 330. When remote entity 330 sends statement 640 and cannot answer client device 350's question, question answer system 100 sends disconnect message 390 that instructs client device 350 to disconnect from remote entity 330. In one embodiment, client device 350 automatically terminates the conversation with remote entity 330. In another embodiment, client device 350 waits for user 360 to terminate the conversation.

Figure 7:
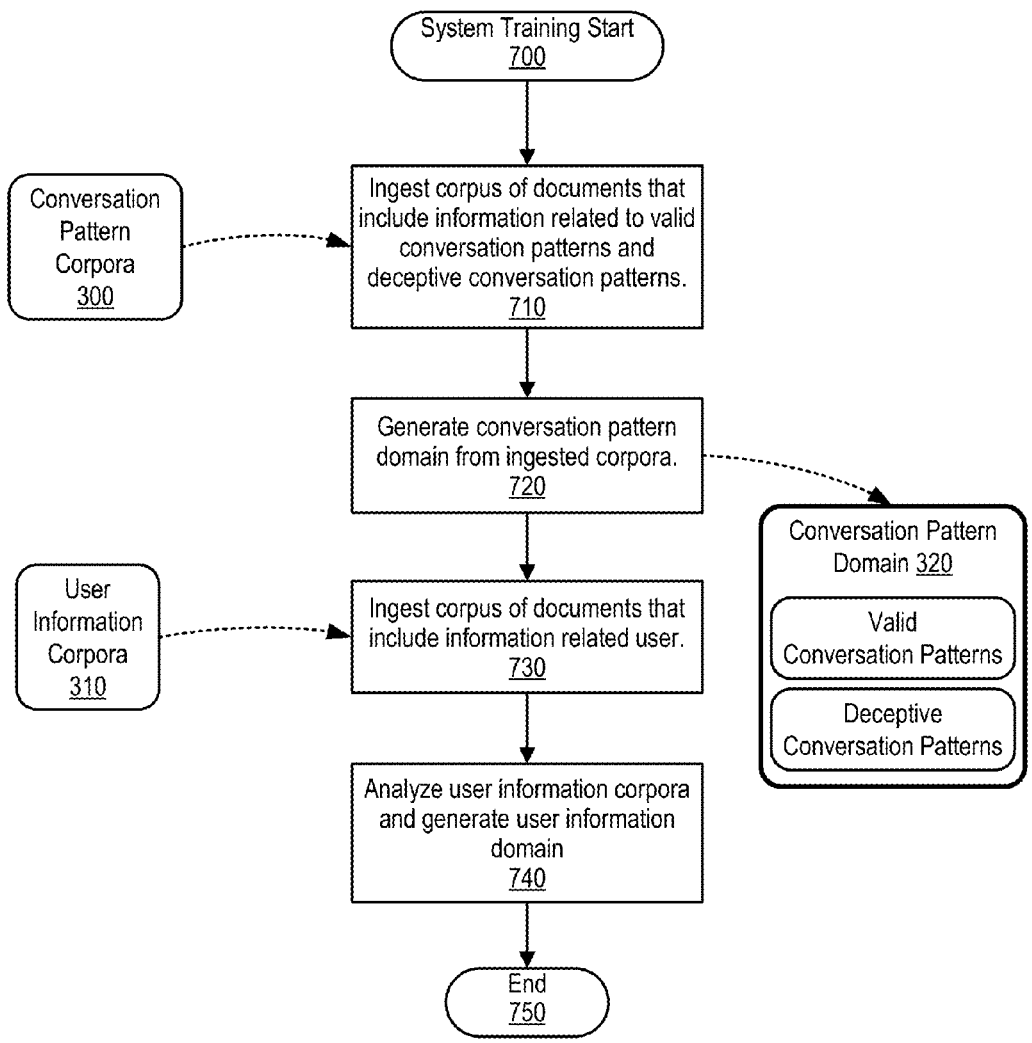
FIG. 7 is an exemplary flowchart depicting steps taken by a process that trains a question answer system to detect deceptive conversation properties.

FIG. 7 commences at 700 and shows steps taken by a process that trains question answer system 100 to detect deceptive conversation properties. At step 710, the process ingests conversation pattern corpora 300 that includes a corpus of documents pertaining to valid conversation patterns and deceptive conversation patterns. For example, conversation pattern corpora 300 may include documents such as bank teller phone etiquette guidelines, phishing articles, telemarketer information, etc.

At step 720, the process generates conversation pattern domain 320 based upon cognitively analyzing conversation pattern corpora 300, which includes valid conversation patterns and deceptive conversation patterns generated from the analysis. For example, a valid conversation pattern and a deceptive conversation pattern may be:

VALID: [Hello from bank][Info provided by bank: A, B, C][Request for information D][Offer of information D];

DECEPTIVE: [Hello from bank][Info provided by bank: A][Request for information D]

The process, at step 730, ingests user information corpora 310, which includes user documents such as bank statements, birth certificates, driver's license information, or other documents that include sensitive information corresponding to the user. The process, in one embodiment, uses this information to verify content provided by remote entities as well as to intercept sensitive content that a user provides to a remote entity (see FIG. 9 and corresponding text for further details).

At step 740, in one embodiment, the process analyzes the user information corpora and generates a user information domain from which to generate validation questions and analyze remote entity information phrases. For example, the process may extract the user's account number from a bank statement and use the account number to validate a remote entity's information phrase or to validate a remote entity's answer to a user's question of "What is my account number?" FIG. 7 processing thereafter ends at 750.

Figure 8:
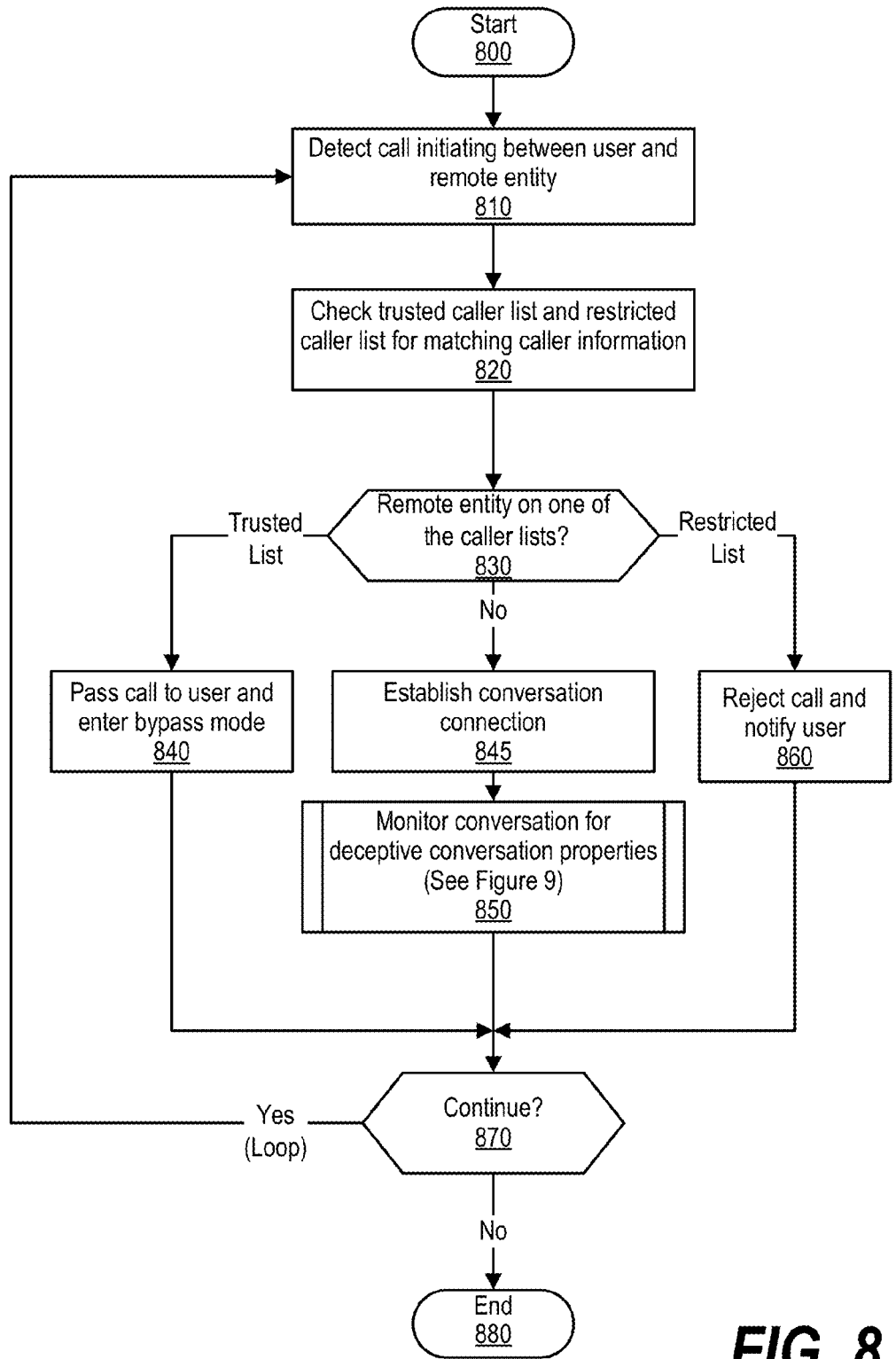
FIG. 8 is an exemplary flowchart depicting steps taken by a process that monitors calls between a user's client device and a remote entity and alerts the user when the process detects a deceptive conversation pattern.

FIG. 8 commences at 800 and shows steps taken by a process that monitors calls between a user's client device and a remote entity and alerts the user when the process detects a deceptive conversation pattern. At step 810, the process detects a call initiated between a user and a remote entity. In one embodiment, the remote entity initiates the call to the user. In another embodiment, the user initiates the call to the remote entity, such as in response to receiving an email from the remote entity or a voice message from the remote entity.

At step 820, the process identifies the remote entity, if possible, and checks a trusted entity list and a restricted entity list for matching remote entity information. The process determines as to whether the remote entity is on one of the remote entity lists (decision 830). If the remote entity is on the trusted list, then decision 830 branches to the "trusted list," whereupon the process passes the call to the user and enters bypass mode at step 840, indicating that the process is not required to monitor the conversation for deceptive conversation patterns. If the remote entity is on the restricted list, decision 830 branches to the "restricted list", whereupon the process terminates the call and, in one embodiment, notifies the user. If the remote entity is not on either remote entity caller list, the process branches to the "no" branch.

At step 845, the process establishes a connection between the user's client device and the remote entity. In one embodiment, the process does not ring the user's phone until after the process determines whether the remote entity is on the restricted list. At predefined process 850, the process constructs a current conversation pattern from cognitive analysis of the conversation and notifies the user when the current conversation pattern exhibits deceptive conversation properties (see FIG. 8 and corresponding text for processing details).

The process monitors the conversation until completion, and the process determines whether to continue detecting calls corresponding to the user's client device (decision 870). If the process should continue, then decision 870 branches to the 'yes' branch, which loops back to wait for another call initiation. On the other hand, if the process should terminate, then decision 870 branches to the 'no' branch. FIG. 8 processing thereafter ends at 880.

Figure 9:
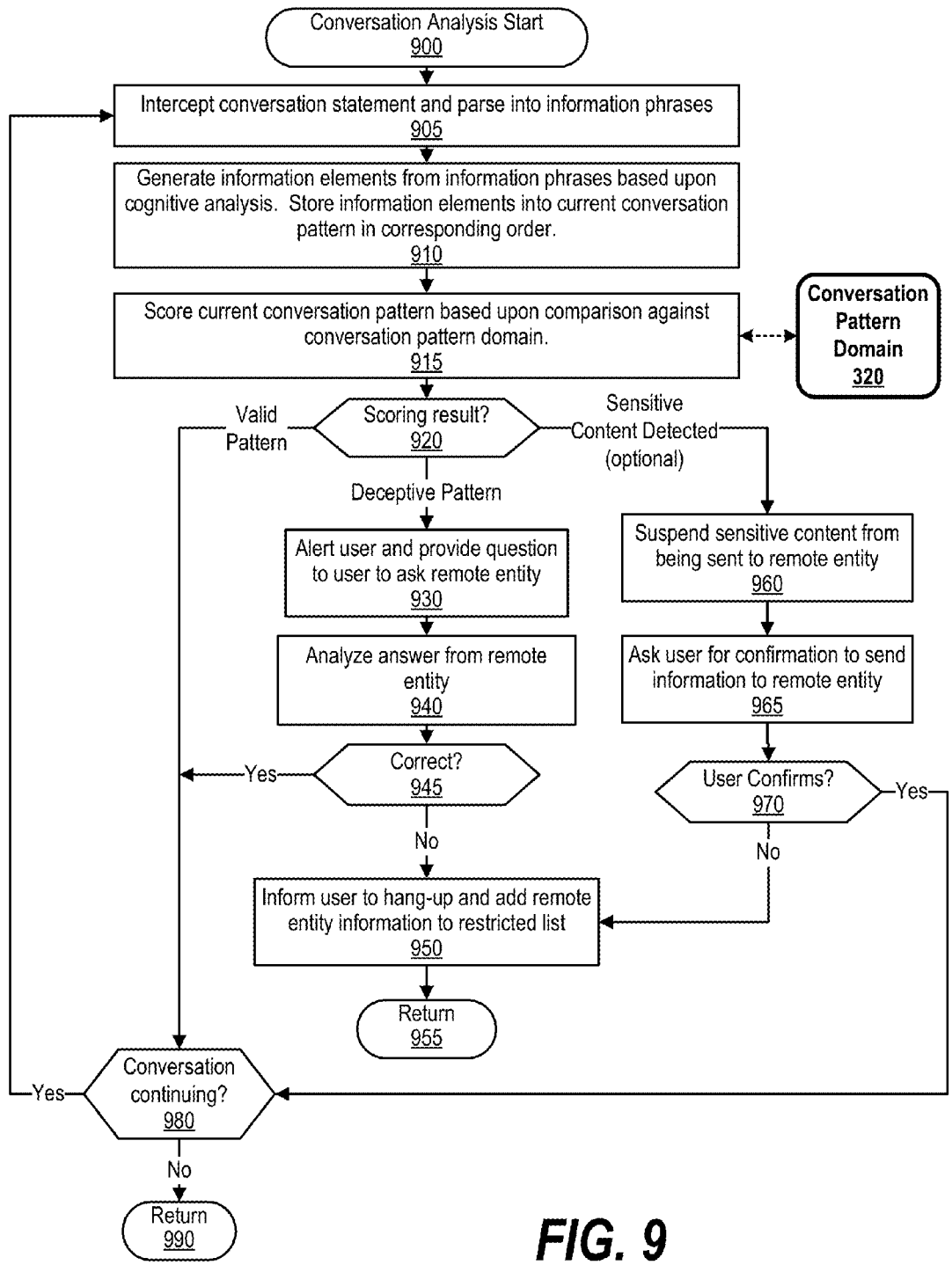
FIG. 9 is an exemplary flowchart depicting steps taken by a process that monitors a conversation and alerts a user when the process detects deceptive conversation properties.

FIG. 9 commences at 900 and shows steps taken by a process that monitors a conversation and alerts a user when the process detects deceptive conversation properties. At step 905, the process intercepts a statement and parses the statement into information phrases. For example, the process may intercept the statement "My name is Tim and I'm from bank ABC calling about your account 123456." In this example, the process parses the statement into information phrases "My name is Tim", "from bank ABC," "account 123456."

Next, the process generates information elements from information phrases by performing cognitive analysis on the information statements (step 910). In one embodiment, question answer system 100 uses English Slot Grammar (ESG) to determine the information elements such as "My name is Tim" (name information element), "from ABC bank" (bank name information element), "account 123456" (account number information element), as well as whether the information element is requested or provided. In turn, the process stores the information elements into a current conversation pattern based upon the order in which they occurred during the conversation. Using the example above, the process may create a current conversation pattern of "tellername→BankABC→account123456."

The process, at step 915, scores the current conversation pattern against conversation pattern domain 320 by comparing the current conversation pattern against conversation pattern domain 320. For example, the current conversation pattern shown above may follow a valid element order of a valid conversation pattern because the teller disclosed the user's bank name and account number in a proper order. In another example, if a caller provided information A and B and asked for information D, the process may generate an increased suspicion score because the caller did not provide information C. However, if information C is not strictly required the process may generate a moderate suspicion score instead of a high suspicion score.

The process compares the suspicion score against a pre-defined suspicion threshold level (e.g., 50%) and determines whether the current conversation pattern includes deceptive pattern properties (decision 920). If the process matched the current conversation pattern with a valid conversation pattern, or generated a low suspicion score because the process did not detect deceptive conversation properties, then decision 920 branches to the "valid pattern" branch whereupon the process determines as to whether the conversation is ongoing (decision 980). If the conversation is ongoing, then decision 980 branches to the 'yes' branch, which loops back to intercept another statement and process the statement accordingly. When the conversation terminates, then decision 980 branches to the 'no' branch, and FIG. 9 processing thereafter returns to the calling routine (see FIG. 8) at 990.

Referring back to decision 920, if the process determines that the current conversation pattern generated a suspicion score that reaches the pre-defined threshold and, as such, exhibits deceptive conversation properties, then decision 920 branches to the "deceptive pattern" branch. At step 930, the process alerts the user and, in one embodiment, provides a validation question to the user to ask the remote entity. For example, the remote entity may have asked "Please provide your social security number" and the process may provide a question to the user to ask the remote entity of "Please tell me my account number first."

At step 940, the process analyzes the remote entity's answer to the validation question and determines whether the answer is correct (decision 945). If the remote entity's answer is correct, then decision 945 branches to the 'yes' branch whereupon the process determines whether the conversation is ongoing. On the other hand, if remote entity's answer is not correct, or the remote entity refuses to provide an answer, then decision 945 branches to the 'no' branch whereupon, at step 950, the process informs the user to terminate the conversation and adds remote entity information corresponding to the remote entity to the restricted list. For example, the process may identify the remote entity's IP address, company name, etc., which the process adds to the restricted list. FIG. 9 processing thereafter returns to the calling routine (see FIG. 8) at 955.

Referring back to decision 920, in one embodiment, if the process detects the client's user attempting to provide sensitive content out of order (e.g., a social security number), the process may generate an increased suspicion score and decision 920 branches to the "sensitive content provided" branch. In this embodiment, a user may configure the process to alert the user regardless of the current conversation pattern, or alert the user when the evaluation score is within a certain threshold range.

At step 960, the process suspends sending the information to the remote entity, such as muting the conversation or bleeping the information. The process asks the user to confirm sending the sensitive information to the remote entity, such as through a display screen (step 965).

If the user confirms sending the sensitive information to the remote entity, then decision 970 branches to the 'yes' branch. On the other hand, if the user does not confirm sending the sensitive information to the remote entity, then decision 970 branches to the 'no' branch, whereupon, at step 950, the process adds remote entity information to the restricted list and informs the user to terminate the conversation. FIG. 9 processing thereafter returns to the calling routine (see FIG. 8) at 955.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory information phrases "at least one" and "one or more" to introduce claim elements. However, the use of such information phrases should not be construed to imply that the introduction of a claim element by the indefinite articles "a" or "an" limits any particular claim containing such introduced claim element to disclosures containing only one such element, even when the same claim includes the introductory information phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   generating, by the processor, a plurality of information elements based upon a voice conversation between a first entity and a second entity over a communication network;
   constructing a current conversation pattern from the plurality of information elements, wherein the current conversation pattern specifies an order of the plurality of information elements based upon the voice conversation;
   identifying one or more deceptive conversation properties of the current conversation pattern based upon analyzing the order of the plurality of information elements in the current conversation pattern against one or more domain-based conversation patterns; and
   sending an alert message to the first entity based upon the identified one or more deceptive conversation properties.

2. The method of claim 1 wherein the voice conversation comprises one or more conversation statements, the method further comprising:
   parsing the one or more conversation statements into a plurality of information phrases based upon cognitive analysis of the one or more conversation statements by a question answer system, wherein the plurality of information elements are generated from the plurality of information phrases;

determining the order of the plurality of information elements based upon a relative order of the plurality of information phrases in the voice conversation; and storing the plurality of information elements in the determined order into the current conversation pattern.

3. The method of claim 2 further comprising:

generating a suspicion score based upon comparing the order of the plurality of information elements against one or more valid element orders corresponding to at least one of the one or more domain-based conversation patterns; and generating the alert message in response to determining that the suspicion score reaches a suspicion threshold.

4. The method of claim 1 further comprising:

retrieving sensitive data corresponding to a first entity user of the first entity;

generating a validation question based upon the retrieved sensitive data, wherein the validation question is configured to be asked by the first entity to validate a second entity user of the second entity; and sending the validation question to the first entity.

5. The method of claim 4 further comprising:

receiving an validation answer from the second entity in response to the first entity user asking the validation question to the second entity user;

determining whether the second entity is a deceptive entity based upon analyzing the received answer against the sensitive data; and notifying the first entity based upon the determination.

6. The method of claim 1 further comprising:

ingesting a conversation pattern corpora that includes a plurality of documents; and generating a conversation pattern domain based upon the plurality of documents, wherein the conversation pattern domain comprises a set of valid conversation patterns and a set of deceptive conversation patterns, and wherein the one or more domain-based conversation patterns are included in the conversation pattern domain.

7. The method of claim 1 further comprising:

sending the alert message to a client device selected from the group consisting of a mobile phone, a landline phone, a television, and a computer system.

8. The method of claim 1 further comprising:

detecting that the first entity is attempting to provide sensitive content to the second entity;

prohibiting the sensitive content from being provided to the second entity;

sending a request to the first entity to authorize sending the sensitive content to the second entity; and terminating the voice conversation in response to not receiving an authorization from the first entity.

9. The method of claim 1 wherein the current conversation pattern corresponds to a dialogue between the first entity and the second entity, and wherein at least one of the plurality of information elements corresponds to the first entity and at least one of the plurality of information elements corresponds to the second entity.

* * * * *